US005084282A

United States Patent [19]

Stuart et al.

[11] Patent Number: 5,084,282

[45] Date of Patent: Jan. 28, 1992

[54] APPARATUS FOR FORMING BRICKS HAVING A TEXTURED EDGE

[75] Inventors: Gerald L. Stuart, Fletcher; Thomas M. Fisher, Enka; Charles B. Whittaker, Cleveland, all of N.C.

[73] Assignee: J.C. Steele & Sons, Statesville, N.C.

[21] Appl. No.: 568,479

[22] Filed: Aug. 16, 1990

[51] Int. Cl.[5] .................... B29C 59/04

[52] U.S. Cl. .................... 425/304; 264/151; 425/296; 425/316; 425/363; 425/385

[58] Field of Search .................... 425/296, 301, 304, 315, 425/316, 385, 302.1; 264/151

[56] References Cited

U.S. PATENT DOCUMENTS 3,468,998 9/1969 Lingl .................... 264/148
4,147,491 4/1979 Postell, Jr. .................... 425/385
4,193,272 3/1980 Bernard .................... 425/316
4,311,073 1/1982 Brugger .................... 83/23
4,340,557 7/1982 Gross .................... 264/146
4,436,501 3/1984 Kenworthy .................... 425/308
4,753,590 6/1988 Milholen .................... 425/385

*Primary Examiner*—Jay H. Woo
*Assistant Examiner*—William Matney, Jr.
*Attorney, Agent, or Firm*—Rhodes, Coates & Bennett

[57] ABSTRACT

A texturing assembly for a machine for forming special brick shapes from extruded slugs of unfired material. The slugs are conveyed forward by conveyor(s) onto an elevator which lifts vertically. This lift pushes the slugs into opposing rollers. The rollers are arranged on opposing shafts spaced to produce vertical indentations in the slugs on 8-inch centers. The edges shaped by the rollers are the 4-inch long textured edges on the finished faces. At a convenient height above the rollers and on matching 8-inch centers are fixed horizontal wires. The cuts by the wires are centered in the indentations made by the opposing rollers. The cut and textured green paver brick rest on top of the slugs captive in the opposing rollers until lifted away by an automatic setting machine.

3 Claims, 7 Drawing Sheets

APPARATUS FOR FORMING BRICKS HAVING A TEXTURED EDGE

BACKGROUND OF THE INVENTION

1) Field of the Invention

The present invention generally relates to a technique for manufacturing brick, and in particular to a system for extruding paver brick having textured faces about the edges.

2) Description of the Prior Art

Brick are make either by molding or extruding. Molding is much slower and is primarily used for special shapes and textures. Paver brick are solid brick, laid flat so that the exposed faces of the brick form the surface of a floor, walkway, patio or street. Molded pavers typically have a chamfer or radius edge around the exposed face. Preferably the edges of the opposite parallel face also have a chamfer or radius.

Textured edges around the face of a paver brick have several advantages over sharp edges: 1) textured edges provide a more desirable appearance to the surface; 2) texture edges are more comfortable to walk upon; 3) sharp edges chip more easily in handling at the factory, in shipment, and at the job site, resulting in higher losses than for textured edges; 4) textured edges produce a paver having both faces chamfered or radiused at the edges and, if damage occurs to one face, the other face is still usable; and 5) textured edges command a higher price in the marketplace.

Unfortunately, the manufacturing cost is much higher for a molded brick than an extruded brick. Molded brick presses are expensive, produce fewer brick per hour, are labor intensive, and are difficult to automate. On the other hand, prior art extruded pavers have sharp or untextured edges of the face due to the geometry of the extruder die and the method of cutting the extruded slugs.

Early roll-edge cutters have textured extruded slugs along a single axis of the brick by pushing the brick through rollers. The Lingl (U.S. Pat. No. 3,468,998) is representative of the use of notching rolls to improve the surface appearance of a slug which is cut by being pushed through wires. Some older designs may have tried to texture along two axis by making two or e pushes at right angles on the slug.

The Kenworthy (U.S. Pat. No. 4,436,501) teaches a method and apparatus of producing special brick shapes such as corner brick. Slugs are pushed from an off-bearing belt under surface treatment means and onto an elevator. A cutter box or frame is located above the elevator. The frame includes both cutter means to cut the slugs into a desired shape and surface treatment means for treating the side edges of the slugs. The elevator raises the slugs up through the cutter frame to a position in alignment with a discharge platform. A pusher assembly operates to push the slugs from the off-bearing belt to the elevator and to push the cut slugs from the elevator onto the discharge platform.

The Brugger et al. (U.S. Pat. No. 4,311,073) teaches an improved method and apparatus for cutting an extruded clay column into individual brick moldings. A conveyor brings the uncut slug into a predetermined position underneath the cutting device. The uncut portion is then transferred to the lifting table. The slug is cut by a plurality of cutting wires secured in the frame which is lowered with respect to the lifting table so that the wires pass through the clay. The frame is then raised to its starting position and the cut slugs are redeposited on the conveyor.

The Gross (U.S. Pat. No. 4,340,557) teaches a method for removing surface defects from plastic blanks. The method includes providing a sheet of polymeric material, pressing lines of demarkation upon the sheet by passing the sheet through a pair of embossing rolls, severing the sheet within the lines to separate and cutting the sheet into individual blanks.

Certain disadvantages become apparent from a close review of these references. For example, multiple pushes or moves through the cutter result in low production rates and high maintenance costs for the cutter. Alternatively, the texturing, grooving and/or edge rolling must be performed by cutters or grooving tools mounted above an intermediate platform.

It has thus become desirable to develop an improved technique for manufacturing brick, and in particular to a system for extruding paver brick having textured faces about the edges without adding movement or increasing production, thereby permitting production by extrusion at a corresponding much lower cost than molding.

SUMMARY OF THE INVENTION

The present invention is directed to a technique for producing brick by an extrusion method that allows all of the edges of two opposite faces of a paver brick to be textured. The textured edges can be a chamfer or radius. A continuous column of clay is first extruded from a horizontal extruder and cut into slugs of a length of several feet. The die and shaper cap of the extruder are designed so that multiple, parallel columns are extruded. The multiple columns are cut simultaneously by a single slug cutter and fed in parallel onto a conveyor. The edges or corners of the extruded column are textured or shaped into a radius or chamfer by the shape of the die on the extruder. The four textured edges formed by extrusion of each slug form the long textured edges on the finished faces.

The slugs of several feet in length are conveyed forward by the conveyor onto an elevator which lifts vertically. This lift pushes the slugs between opposing rollers. The rollers are arranged on opposing shafts spaced to produce vertical indentations in the slugs on 8-inch centers. The opposing shafts have one way clutches so that the slugs are captive in the rollers as the empty elevator goes down to accept the next group of slugs. The next group of slugs is then lifted between the opposing rollers. The bottom slugs lift the slugs above them. This action continues until the top slugs are clear of the rollers. The edges shaped by the rollers are the 4-inch long textured edges on the finished faces.

At a convenient height above the rollers and on matching 8-inch centers are fixed horizontal wires. The cuts by the wires are centered in the indentations made by the opposing rollers. The height of the horizontal cutter wires determine whether the slugs are partially or completely cut in one up stroke of the elevator. The cut and textured green paver brick rest on top of the slugs captive in the opposing rollers until lifted away by an automatic setting machine. Edge setting is preferred but the present invention can be adapted to flat setting for other brick styles by changing the cross section at the die.

Accordingly, one aspect of the present invention is to provide an apparatus for forming special brick shapes from extruded slugs of unfired material. The apparatus includes: means for conveying the slugs to a grouping area; a cutter and texturing assembly for receiving the slugs from the conveying means and imparting a first edge treatment, the cutter and texturing assembly including at least one pair of opposing texturing rollers; elevator means adjacent to the grouping area for moving the slugs vertically to a first position below the cutter and texturing assembly; means for sequentially moving the slugs below the cutter and texturing assembly upwardly through the pair of texturing rollers, thereby imparting the first edge treatment, to a second position above the cutter and texturing assembly; and transfer means adjacent to the cutter and texturing assembly for receiving the slugs from above the cutter and texturing assembly.

Another aspect of the present invention is to provide a cutter and texturing assembly for a machine for forming special brick shapes from extruded slugs of unfired material. The cutter and texturing assembly includes: at least one pair of opposing texturing rollers and a wire cutter bank for receiving the slugs; elevator means for moving the slugs vertically to a first position below the at least one pair of opposing texturing rollers; and means for sequentially moving the slugs below the cutter and texturing assembly upwardly through the at least one pair of opposing texturing rollers, thereby imparting a first edge treatment, to a second position above the cutter and texturing assembly.

Still another aspect of the present invention is to provide an apparatus for forming a paver brick having textured edges from extruded slugs of unfired material. The apparatus includes: means for conveying the slugs to a grouping area; a cutter and texturing assembly for receiving the slugs from the conveying means and imparting a first edge treatment, the cutter and texturing assembly including at least one pair of opposing texturing rollers and a wire cutter bank; elevator means adjacent to the grouping area for moving the slugs vertically to a first position below the cutter and texturing assembly; means for sequentially moving the slugs below the cutter and texturing assembly upwardly through the pair of texturing rollers, thereby imparting the first edge treatment, to a second position above the cutter and texturing assembly; and transfer means adjacent to the cutter and texturing assembly for receiving the slugs from above the cutter and texturing assembly.

These and other aspects of the present invention will become apparent to those skilled in the art after a reading of the following description of the preferred embodiment when considered with the drawings.

DESCRIPTION OF THE PREFERRED EMBODIMENT

Figure 1:
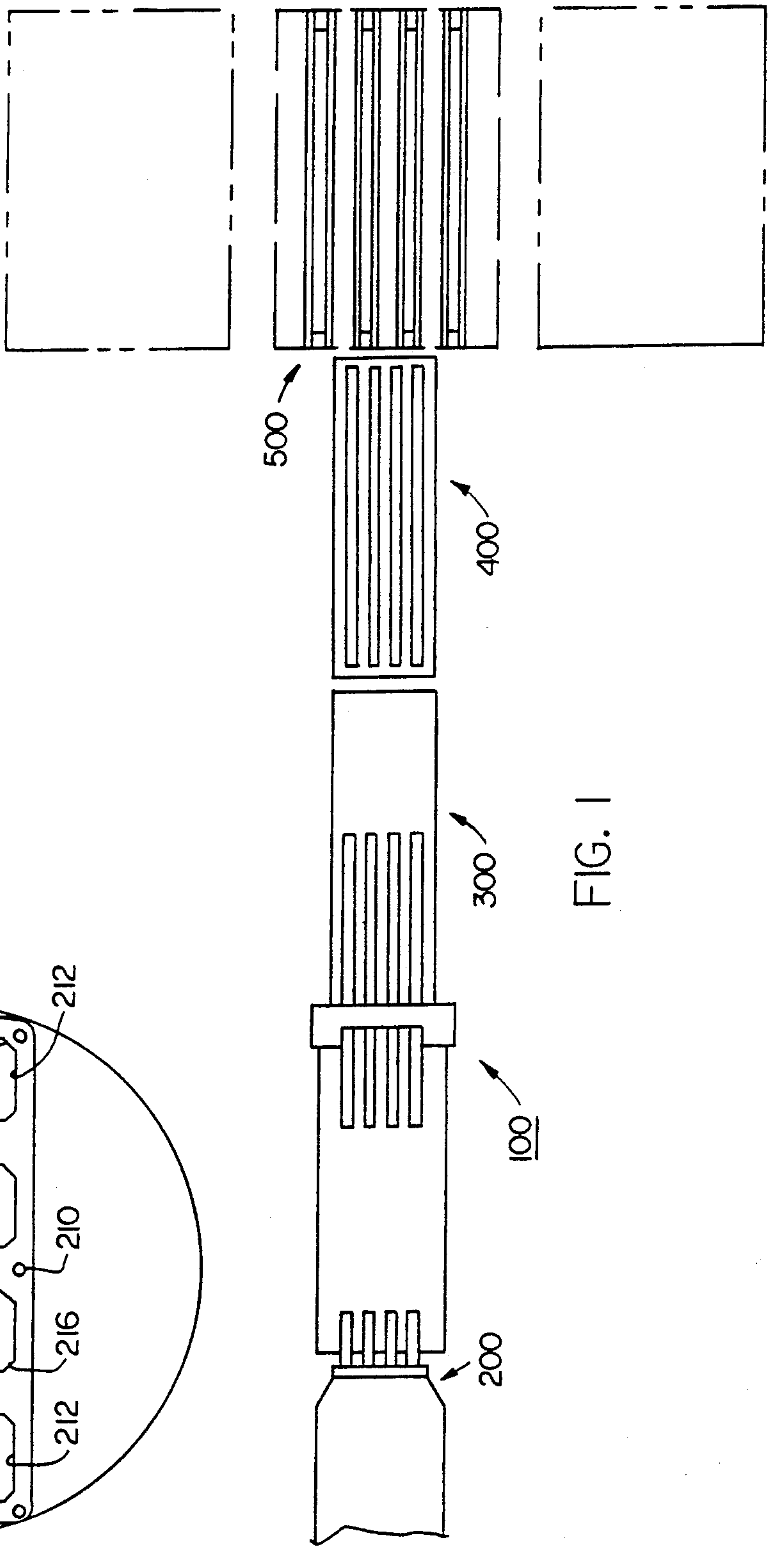
FIG. 1 is a plan view of an apparatus constructed according to the present invention.

In the following description, like reference characters designate like or corresponding parts throughout the several views. Also in the following description, it is to be understood that such terms as "forward", "rearward", "left", "right", "upwardly", "downwardly", and the like are words of convenience and are not to be construed as limiting terms.

Referring now to the drawings in general and to FIG. 1 in particular, it will be understood that the illustrations are for the purpose of describing a preferred embodiment of the invention and are not intended to limit the invention thereto. As best seen in FIG. 1, there is illustrated the overall apparatus according to the present invention, generally designated 100.

By way of orientation to the apparatus, multiple, parallel, and continuous columns of clay are first extruded from a horizontal extruder and cut into slugs of a length of several feet. The edges or corners of the extruded column are textured or shaped into a radius or chamfer by the shape of the die on the extruder.

The slugs are conveyed forward by a conveyor onto an elevator which lifts vertically. This lift pushes the slugs into opposing rollers. The rollers are arranged on opposing shafts spaced to produce vertical indentations in the slugs on 8-inch centers. The edges shaped by the rollers are the 4-inch long textured edges on the finished faces.

At a convenient height above the rollers and on matching 8-inch centers are fixed horizontal wires. The cuts by the wires are centered in the indentations made by the opposing rollers. The cut and textured green paver brick rest on top of the slugs captive in the opposing rollers until lifted away by an automatic setting machine. A detailed description of each stage of the operation follows.

Extruder Sub-System

The Extruder Sub-System 200 includes a continuous extruder 202, a special shaper cap assembly 204, and an Extruder Belt Conveyor assembly 206. The extruder 202 is conventional in design and operates to produce a continuous stream of green material.

Figure 2:
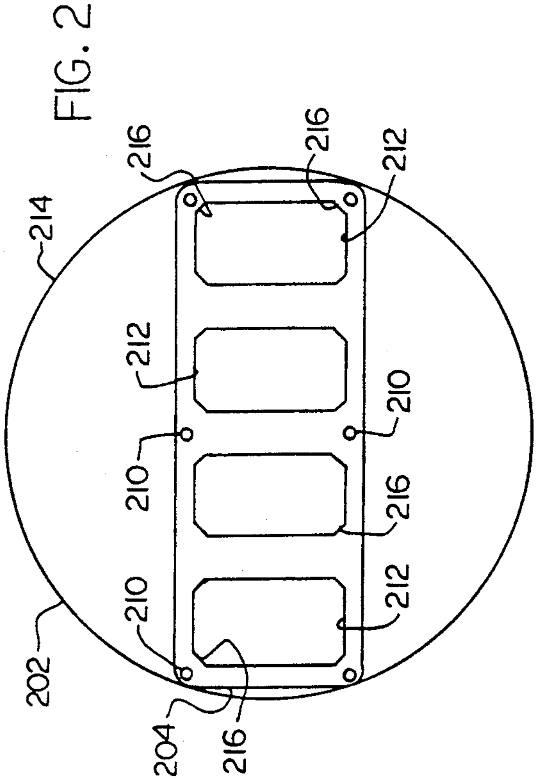
FIG. 2 is an enlarged front elevational view of the shaper cap of the extruder assembly of the present invention.
Figures 3A, 3B, 3C, 3D, 3E:
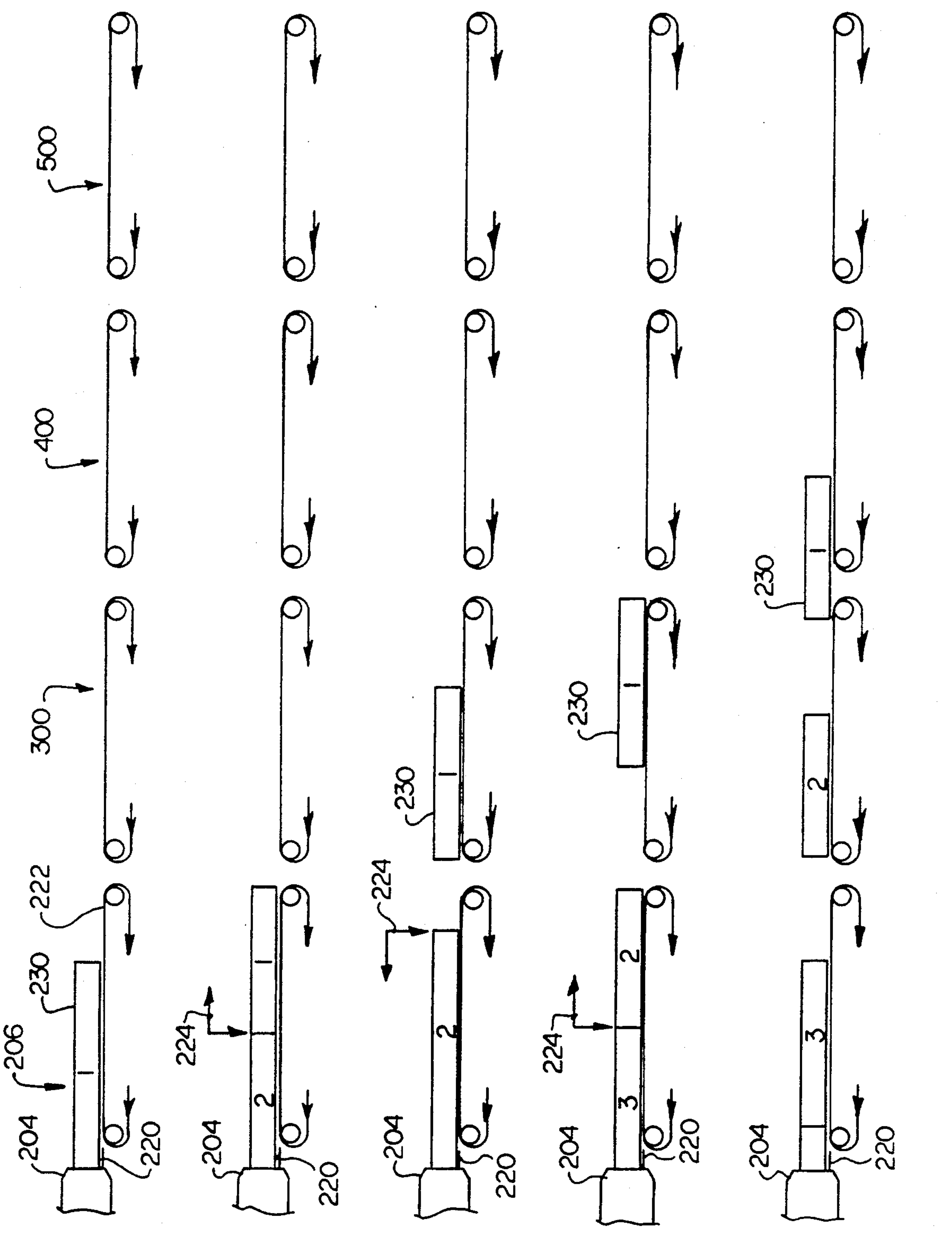
FIGS. 3A through 3E schematically illustrate the brick movement through successive stages during the extrusion and speed up operations.
Figure 4A:
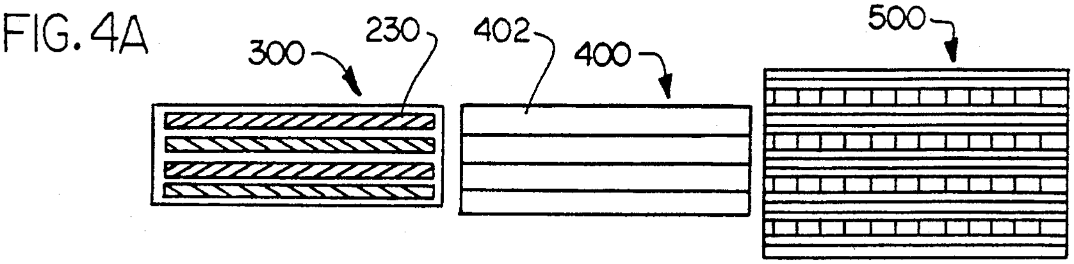
FIGS. 4A through 4E schematically illustrate the brick movement through successive stages during the spreading operation.
Figure 4B:
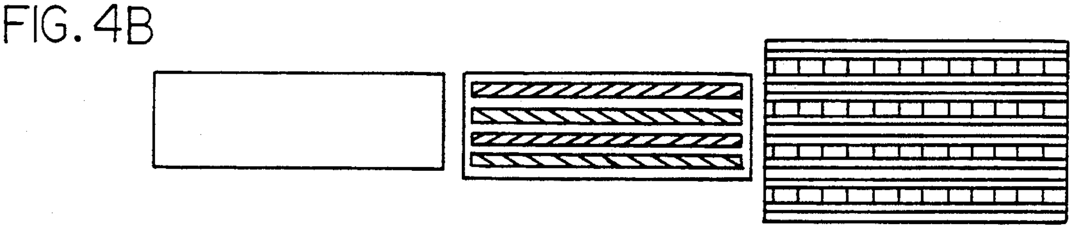
Figure 4C:
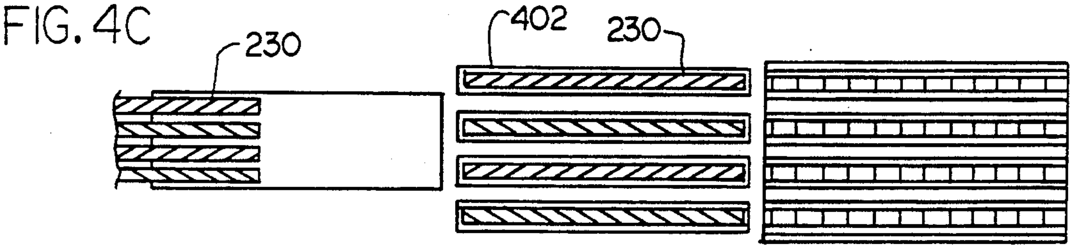
Figure 4D:
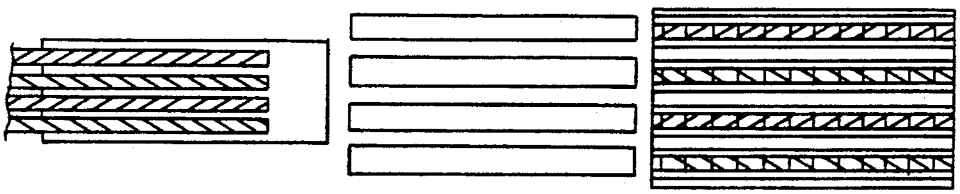
Figure 4E:
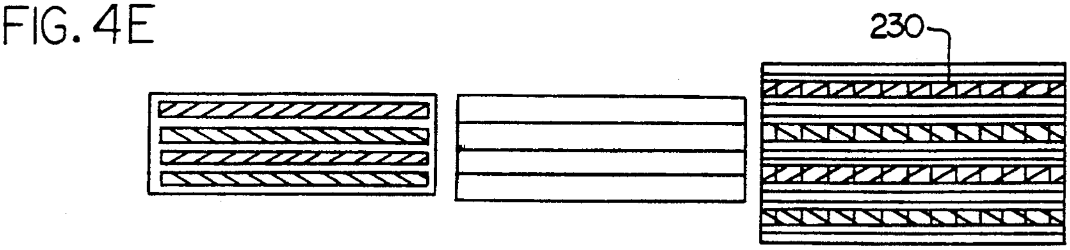

As best seen in FIG. 2, the shaper cap assembly 204 attached to the exit end of the extruder 202 is illustrated. The shaper cap assembly 204 is attached to the exit end of the extruder 202 by a plurality of threaded fasteners 210 in a conventional manner. However, unlike a conventional shaper cap, the shaper cap assembly 204 includes a plurality of apertures 212 for permitting multiple columns of green material to be extruded from the extruder 202. Preferably, the apertures 212 are oriented to present an end cross section, approximately $2\frac{1}{2}$ by 4 inches. The reasons for this preferred orientation will become more apparent upon a further reading of this specification.

Also, in the preferred embodiment, the number and orientation of the apertures 212 are dependent on the radius 214 of the auger of the extruder 202. For example, in order to produce substantially equal flow rates of the columns of green material, the plurality of apertures 212 should be within the radius 214 of the auger of the extruder 202 otherwise the effects of the internal friction within the extruder 202 can begin to cause abnormalities in the flow of the streams of green materials. While these abnormalities can be compensated for by die design and process control, they are preferably avoided by choosing an extruder 202 having a sufficiently large radius 214 to accommodate the plurality of apertures 212.

As can be seen in FIG. 2, at least one corner 216 of each aperture is chamfered or radiused. Accordingly, when the green material exits the shaper cap 204, an edge is put on the column of green material in the longitudinal direction of extrusion. Preferably, all four corners 216 of each aperture 212 are chamfered or radiused in order to form a radius along four of the twelve edges of each stream of green material. As will become apparent, this operation is the first step in producing an extruded paver brick having chamfered or radiused edges all along at least one face.

As the continuous columns of green material exit the shaper cap assembly 204, they are received by the Extruder Belt Conveyor assembly 206. Its operation is best seen in FIGS. 3A through 3E which schematically illustrate the brick movement through successive stages during the extrusion and speed up operations. The Extruder Belt Conveyor assembly 206 consists of a short section of slider bed 220, a belt on roller bed conveyor 222, a slug cutter 224, and a section of live roll conveyor, a series of driven rollers between the end of roller bed conveyor 222 and Speed Up conveyor 300 (not shown). The slider bed 220 is moveable to facilitate extruder maintenance and changeover. The Extruder Belt Conveyor assembly 206 has adjustable guides (not shown) which maintain the extruded streams, centers through the slug cutter 224. The slug cutter 224 simultaneously cuts all four slug streams into elongated slugs 230 of about 12 brick long. Belt speed is hydraulically variable at a speed consistent with extruder 202 output. Estimated extruder output is 20,000 Standard Paver Equivalent (SPE).

Speed Up Sub-System

As also shown in FIG. 3, the Speed Up Conveyor 300 receives the four parallel slugs 230 from the Extruder assembly 200 and accelerates the slugs 230 to about twice the speed of the off bearing conveyor 222 and, therefore, creates a gap between axially adjacent slugs 230. This gap provides sufficient time for the next operation in the process. The slugs 230 are then delivered to the Separation Conveyor 400.

Separating Sub-System

The operation of the Separation Conveyor 400 is best illustrated in FIGS. 4A through 4E which schematically illustrate the brick movement through successive stages during the spreading operation. The Separation Conveyor 400 consists of four separate, narrow conveyors 402; one for each cut slug. The Separation Conveyor 400 receives the four parallel cut slugs 230 from the Speed up Conveyor 300 on their extruded centers in closed in position (Step A). The four narrow conveyors 402 then stop (Step B) and spread apart (Step C) to the centers required by the Cutter and Texturing Device 500. The narrow conveyors 402 are started again to feed the four cut slugs 430 into the Cutter Feed conveyor 404 adjacent to the Cutter and Texturing Device 500 (Step D). The Cutter Feed Conveyor 404 receives the four slugs on their non-extruded centers, decelerates, and aligns the slugs 230 with the Cutter and Edge Texturing Device 500. The four conveyors 402 then close (Step E) to accept the next group of four slugs 230.

Cutter and Texturing Sub-System

Figure 5:
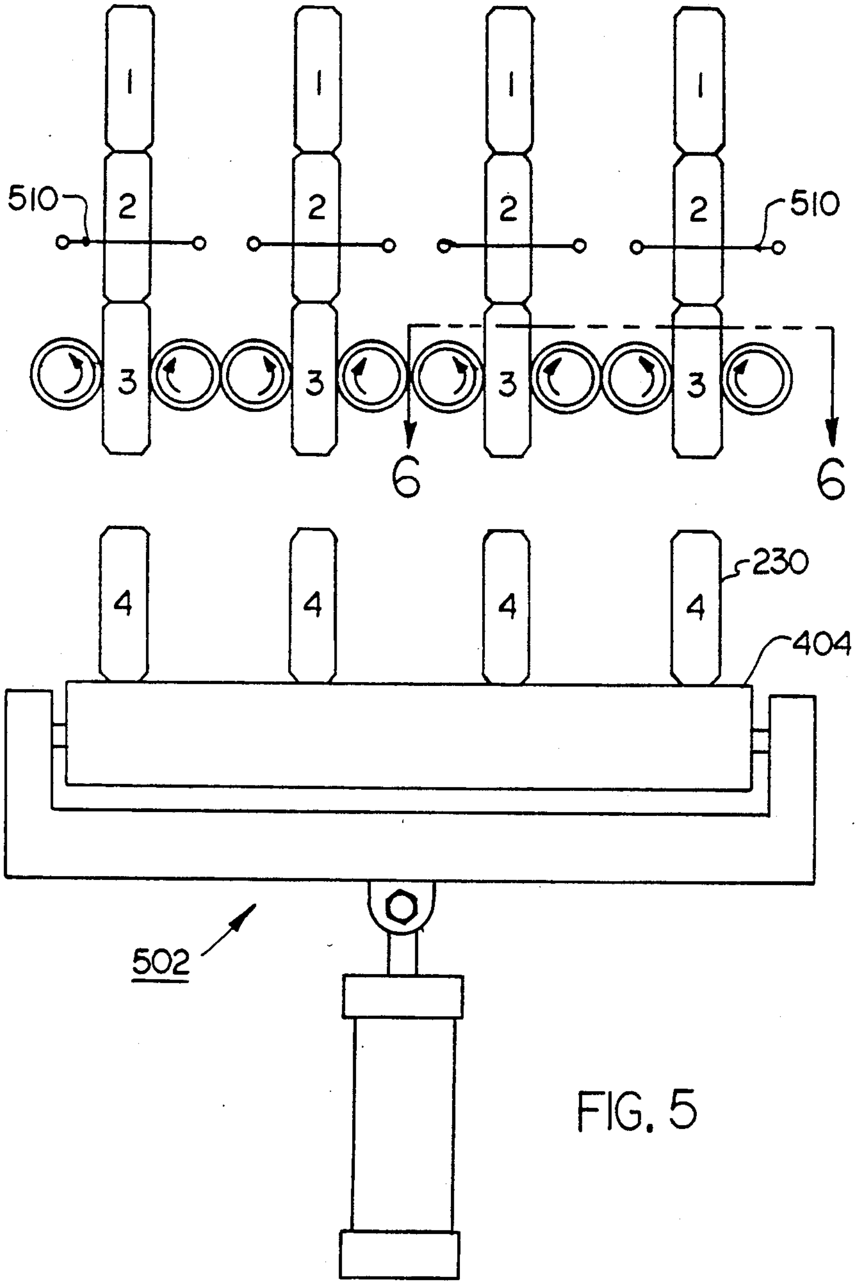
FIG. 5 is a front elevational view of the cutter assembly of the present invention.

Turning now to FIG. 5, there is illustrated a front elevational view of the Cutter and Edge Texturing assembly 500 of the present invention. The Cutter Feed Conveyor 404 lifts the cut slugs 230 through the Cutter and Texturing Device 502. The Cutter and Texturing Device 502 includes end texturing rollers 504 having one way clutches 506 to support the cut slugs 230. Cutter wires 510 above the rollers 502 and aligned therewith cut the slugs 230 into their final length.

The texturing rollers 504 turn free as the slugs 230 are lifted but the one way clutches 506 prevent the Texturing roller 504 from reversing, thus supporting the slugs 230 and the cut pavers above and in wires 510. Scrap Conveyors (not shown) located near the Cutter and Edge Texturing Device 502 receive the waste slices and slugs not suitable for production and returns the waste to the extruder pug mill (not shown).

Figure 6:
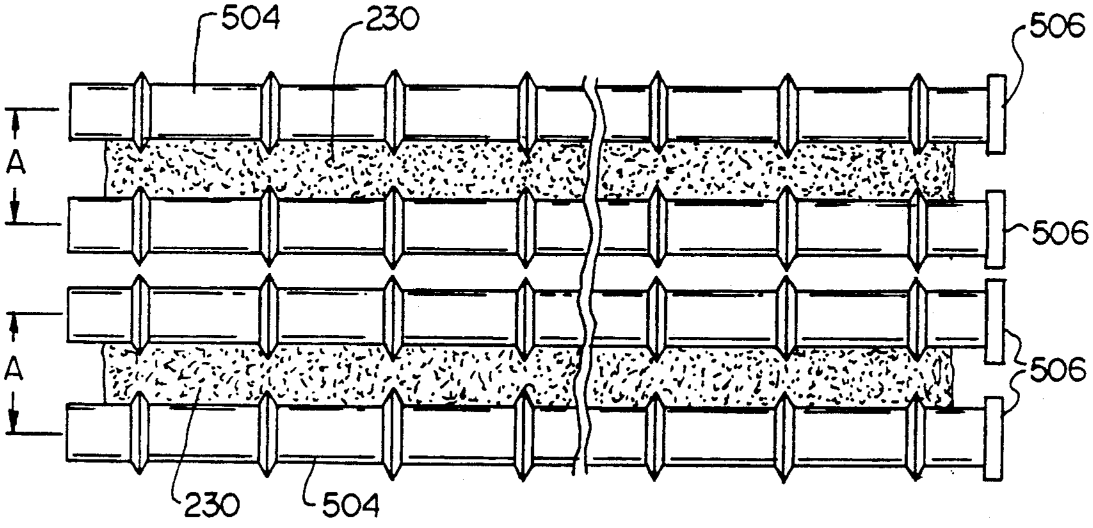
FIG. 6 is an enlarged cross-sectional view of the cutter assembly shown in FIG. 5, taken along lines 6—6.
Figure 7A:
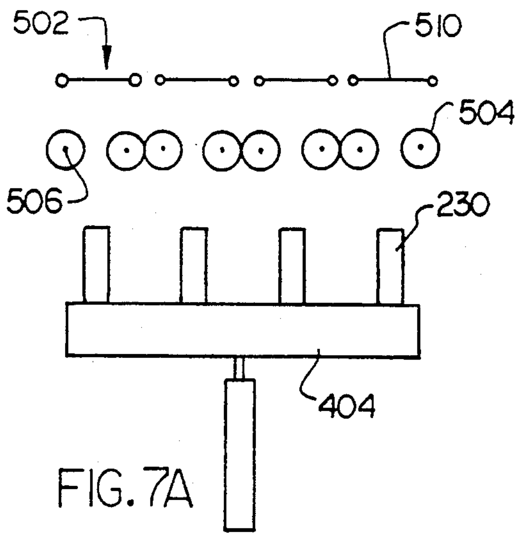
FIGS. 7A through 7F schematically illustrate the brick movement through successive stages during the cutting operation.
Figure 7B:
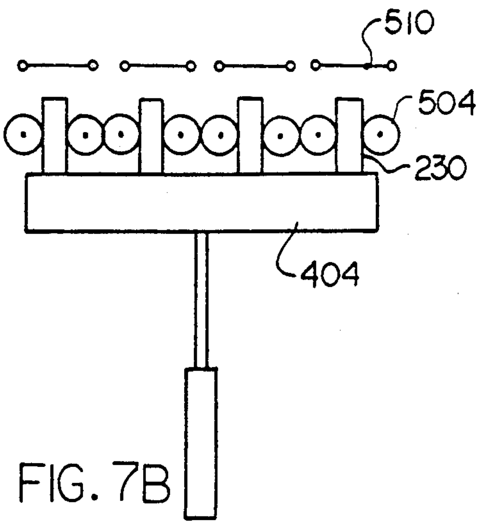
Figure 7C:
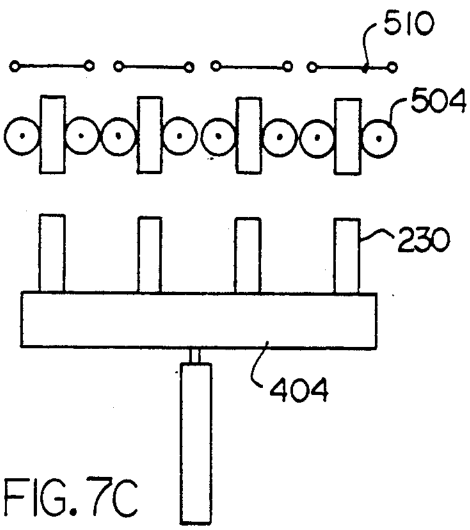
Figure 7D:
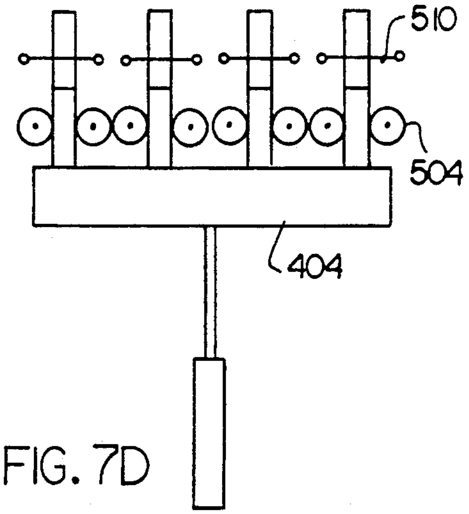
Figure 7E:
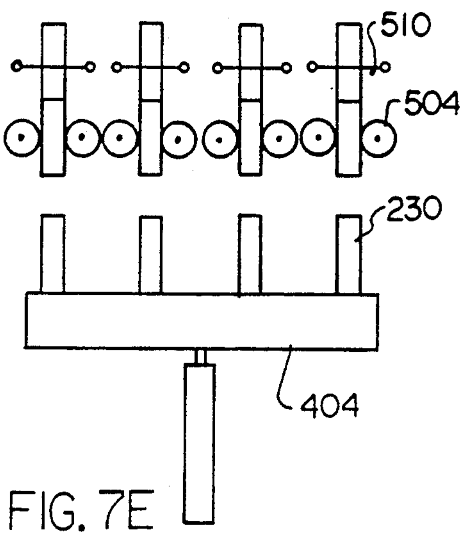
Figure 7F:
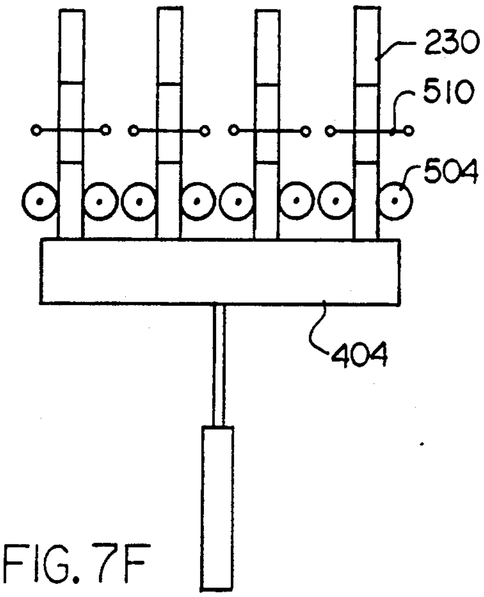

FIG. 6 is an enlarged cross-sectional view of the Cutter and Edge Texturing Device 502 shown in FIG. 5, taken along lines 6—6. As can be seen, rollers 504 are adjustable so that the spacing between adjacent pairs of rollers 504 can be set to match the width of the chamfered edges formed by shaper cap assembly 204. For example, the width of the extruded chamfers will change as the shaper cap assembly 204 wears. Any of a number of conventional arrangements, including cylinders and stops may be used to allow quick changeover by changing the dimension "A" which corresponds to the smallest distance between parallel paver faces.

It is apparent from FIG. 6 that changes in the final length of the green pavers would require a corresponding change in the texturing rings 506 of the texturing rollers 503 and the cutting wires 510. However, small changes in the width of the paver, with the height as oriented generally 4 inches, only requires a change in the shaper cap assembly 204 and do not require a change in the cutter setup.

FIGS. 7A through 7F schematically illustrate the brick movement through successive stages during the cutting operation. First, the Cutter Feed Conveyor 404 comes down and the belt is running (Step A). Second, four slugs 230 are positioned on the Cutter Feed Conveyor 404 and the belt stops (Step B). Third, the Cutter Feed Conveyor lifts a full stroke, pushing slugs 230 about half way through rollers 504 (Step C).

As the sequence is repeated, the Cutter Feed Conveyor 404 goes down and clutches 506 enable rollers 504 to hold slugs 230 in place. Four additional slugs 230 are run in the same manner as Step B. The Cutter Feed Conveyor 404 again lifts a full stroke in the same manner as Step C. This action lifts the first row of slugs through the rollers 504 and partially through wires 510 by the action of the second row of slugs. As the sequence continues to be repeated, each row of slugs 230 is indexed upward by each new lift of Cutter Feed Conveyor 404 until the first row of slugs 230 clears the wires 510. Transfer Device 600 than operates to remove the cut pavers from the Cutter and Texturing Device 502 as the Cutter Feed Conveyor goes down in Step A.

Transfer Sub-System

The Brick Transfer system 600 removes the cut and textured pavers (4 rows of 12 each) from the Cutter and Texturing Device 502. The cut brick are received by a twin head transfer. The cut brick are gripped by vacuum pads on the tops of the cut brick (paver edges). Twelve vacuum grippers are carried by a common carriage. Four grippers form one head. The grippers are arranged on linear ball bearings or the equivalent to spread in the header direction. The four carriages are on linear ball bearings and spread in the bed depth direction for 50 mm pavers only. Spread in both directions is by air cylinder. The four carriages are maintained parallel by racks and pinions.

The twin head transfer is arranged such that when on head is at the west set down area, the other head is ready to receive brick from the cutter and visa-versa. Four rows of 12 brick are transferred to the set down area on each cycle. The cut brick are spaced north-south to develop the header spacing as they are set on the kiln car. Each transfer head has a "park" position beyond the west set down area to provide clear access to the cutter texturing device for maintenance and/or changeover.

Figure 8A:
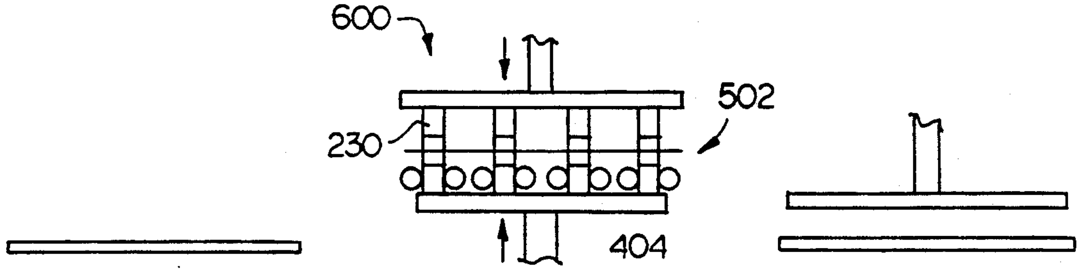
FIGS. 8A through 8C schematically illustrate the brick movement through successive stages during the transfer operation.
Figure 8B:
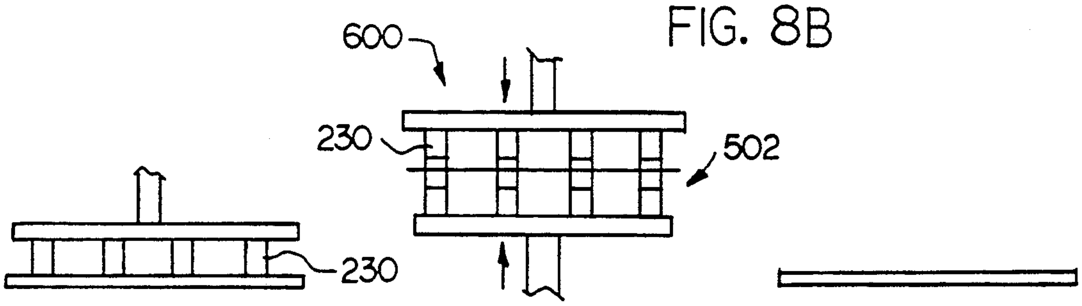
Figure 8C:
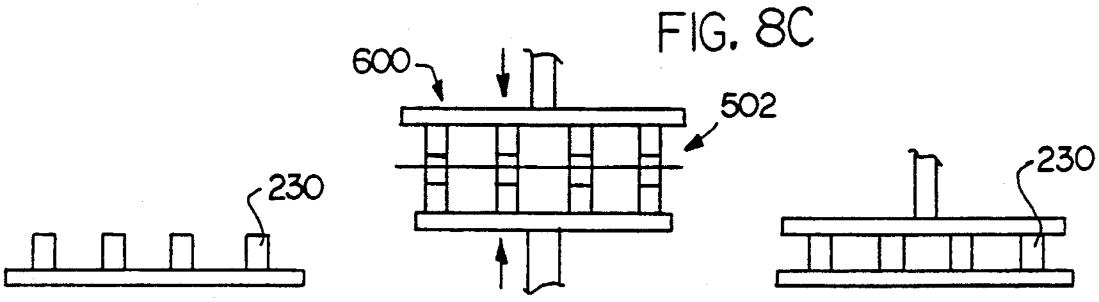

FIGS. 8A through 8C schematically illustrate the brick movement through successive stages during the transfer operation. First, when the Cutter Feed Conveyor 404 is up, the first transfer head grippers come down and contact the upper rows of cut pavers. The vacuum is turned on to the grippers and the first transfer head lifts a few inches to clear the Cutter and Texturing Device 502. The first transfer head travels to the marshalling table and the space between the headers is spread. In the meantime the second transfer head is now in position above the Cutter and Texturing Device 502 and the space between its grippers is closed. The first transfer head comes down to the marshalling table while the second transfer head comes down to the next roll of cut pavers. The first transfer head's grippers release its rows of cut pavers while the second transfer head's grippers pickup its rows of cut pavers. Both transfer heads lift a few inches and the process continues to be repeated.

Set Down and Marshalling Sub-System

The Set Down and Marshalling Conveyors are generally conventional in design and alternatively receive cut and textured pavers from the Brick Transfer System and index them perpendicular to the off bearing belt into the spacing required for the setting pattern.

Thus, in operation, suppose it is desired to make paver bricks that are two inches thick with parallel both 4"×8" rectangles must be textured. A continuous column of clay is extruded from continuous extruder 202 through a plurality of apertures 212 for permitting multiple columns of green material from the extruder 202. The edges or corners of the extruded column are textured or shaped into a radius or chamfer by the shape of the die on the extruder 202. The four textured edges formed by extrusion will be the 8-inch long textured edges on the finished faces. The column, as extruded, measures two inches in width, four inches in height. As the continuous columns of green material exit the shaper cap assembly 204, they are received by the Extruder Belt Conveyor assembly 206. The slug cutter 224 simultaneously cuts all four slug streams into elongated slugs 230 of about 12 brick long.

The Speed Up Conveyor 300 receives the four parallel slugs 230 from the Extruder assembly 200 and accelerates the slugs 230 to create a gap between axially adjacent slugs 230. This gap provides sufficient time for the next operation in the process. The slugs 230 are then delivered to the Separation Conveyor 400.

The Separation Conveyor 400 receives the four parallel cut slugs 230 from the Speed up Conveyor 300 on their extruded centers in closed in position. The four narrow conveyors 402 then stop and spread apart to the centers required by the Cutter and Texturing Device 500. The narrow conveyors 402 are started again to feed the four cut slugs 430 into the Cutter Feed conveyor 404 adjacent to the Cutter and Texturing Device 500. The Cutter Feed Conveyor 404 receives the four slugs on their non-extruded centers, decelerates, and aligns the slugs 230 with the Cutter and Edge Texturing Device 500. The four conveyors 402 then close to accept the next group of four slugs 230.

The Cutter Feed Conveyor 404 lifts the cut slugs 230 through the Cutter and Texturing Device 502. The texturing rollers 504 turn free as the slugs 230 are lifted but the one way clutches 506 prevent the Texturing roller 504 from reversing, thus supporting the slugs 230 and the cut pavers above and in wires 510.

The Cutter Feed Conveyor 404 comes down and the belt is running. Four slugs 230 are positioned on the Cutter Feed Conveyor 404 and the belt stops. The Cutter Feed Conveyor lifts a full stroke, pushing slugs 230 about half way through rollers 504. As the sequence is repeated, the Cutter Feed Conveyor 404 goes down and clutches 506 enable rollers 504 to hold slugs 230 in place. Four additional slugs 230 are run in. The Cutter Feed Conveyor 404 again lifts a full stroke. This action lifts the first row of slugs through the rollers 504 and partially through wires 510 by the action of the second row of slugs. As the sequence continues to be repeated, each row of slugs 230 is indexed upward by each new lift of Cutter Feed Conveyor 404 until the first row of slugs 230 clears the wires 510.

Transfer Device 600 then operates to remove the cut pavers from the Cutter and Texturing Device 502 as the Cutter Feed Conveyor goes down. The cut brick are received by a twin head transfer device. The cut brick are gripped by vacuum pads on the tops of the cut brick. When the Cutter Feed Conveyor 404 is up, the first transfer head grippers come down and contact the upper rows of cut pavers. The vacuum is turned on to the grippers and the first transfer head lifts a few inches to clear the Cutter and Texturing Rollers Device 502. The first transfer head travels to the Marshalling table and the space between the headers is spread. In the meantime the second transfer head is now in position above the Cutter and Texturing Rollers Device 502 and the space between its grippers is closed. The first transfer head comes down to the Marshalling table while the second transfer head comes down to the next roll of cut pavers. The first transfer head's grippers release its rows of cut pavers while the second transfer head's grippers pickup its rows of cut pavers. Both transfer heads lift a few inches and the process continues to be repeated.

The Set Down and Marshalling Conveyors alternatively receive the cut and textured pavers from the Brick Transfer System and index them perpendicular to the direction of the extrusion path into the spacing required for the setting pattern.

The cutter of the present invention could be used in a manual plant and the brick taken safely away by hand since no moving parts are in the discharge area. In its simplest form, the Cutter Feed Conveyor 404 is the only driven moving part. The waste from the Cutter and Texturing Device 502 can be permitted to fall back on the elevator, if a movable stop is added to the exit end of the elevator. The stop would be out of the way and the conveyor running as it lowers to carry the waste off the discharge end. The stop would swing back in place to stop the next slugs.

The present invention cuts and textures the face edges of the pavers and presents four parallel rows of 12 brick each to the setter in order to produce a production rate of 20,000 SPEs. The cutter frame could be configured to be longer than 12 brick thereby allowing a slower cycle rate. However, preferably the number of brick processed per row is chosen as a multiple of the number needed on the kiln car to eliminate additional counting of the brick prior to setting. Accordingly, forty-two rows of 12 pavers each will form a single course with a 7 over 2 pattern on a 12 foot by 12 foot kiln car. Similarly, thirty rows of 12 pavers each will form a single course with a 5 over 2 pattern.

Certain other modifications and improvements will occur to those skilled in the art upon reading of the foregoing description. By way of example, various geometries of the extruded and rolled edges could be chosen including edges having different radii and chamfers. It should be understood that all such modifications and improvements have been deleted herein for the sake of conciseness and readability but are properly within the scope of the following claims.

We claim:

1. A cutter and texturing assembly for a machine for forming special brick shapes from extruded slugs of unfired material, comprising:

(a) at least one pair of opposing texturing rollers and a wire cutter bank for receiving said slugs;

(b) elevator means for moving said slugs vertically to a first position below said at least one pair of opposing texturing rollers; and (c) means for sequentially moving said slugs below said at least one pair of opposing texturing rollers upwardly through said at least one pair of opposing texturing rollers to a second position above said at least one pair of opposing texturing rollers, wherein said means for sequentially moving said slugs below said at least one pair of texturing rollers upwardly through said at least one pair of opposing texturing rollers to a second position above said at least one pair of texturing rollers includes at least one one-way clutch attached to one end of each of said at least one pair of opposing texturing rollers, said clutch being operable to permit said slugs to move freely upward between said at least one pair of opposing texturing rollers, while preventing downward movement between said at least one pair of opposing texturing rollers.

2. The apparatus according to claim 1, wherein said wire cutter bank is located above one pair of opposing texturing rollers.

3. The apparatus according to claim 1, wherein said at least one pair of opposing texturing rollers includes a pair of elongated, cylindrical rollers concentrically mounted upon a rotatable shaft, each of said pair of rollers having a plurality of equidistantly mounted texturing rings mounted to the surface thereof, said texturing rings being operable to impart a first textured edge upon said extruded slugs.

* * * * *